(12) United States Patent
Arndt et al.

(10) Patent No.: US 10,754,152 B2
(45) Date of Patent: Aug. 25, 2020

(54) HEAD-UP DISPLAY SYSTEM FOR CALIBRATING AND CORRECTING IMAGE INFORMATION FOR AN OBSERVER

(71) Applicant: SAINT-GOBAIN GLASS FRANCE, Courbevoie (FR)

(72) Inventors: Martin Arndt, Aachen (DE); Marek Patschger, Leonberg (DE); Ninet Babajani, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/318,595

(22) PCT Filed: May 12, 2017

(86) PCT No.: PCT/EP2017/061428
§ 371 (c)(1),
(2) Date: Jan. 17, 2019

(87) PCT Pub. No.: WO2018/015039
PCT Pub. Date: Jan. 25, 2018

(65) Prior Publication Data
US 2019/0285882 A1 Sep. 19, 2019

(30) Foreign Application Priority Data
Jul. 18, 2016 (EP) .................................. 16179955

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/10568* (2013.01);
(Continued)

(58) Field of Classification Search
CPC ..... G06F 1/1639; G06F 3/0425; G02B 27/01; G02B 27/0101; G02B 2027/011;
(Continued)

(56) References Cited

U.S. PATENT DOCUMENTS 4,961,625 A * 10/1990 Wood ..................... G02B 27/01
359/630
7,205,964 B1 4/2007 Yokoyama et al.
(Continued)

FOREIGN PATENT DOCUMENTS

CN 102745084 A 10/2012
DE 10 2005 037797 A1 2/2007
(Continued)

OTHER PUBLICATIONS

International Search Report as issued in International Patent Application No. PCT/EP2017/061428, dated Jul. 20, 2017.

*Primary Examiner* — Darlene M Ritchie
(74) *Attorney, Agent, or Firm* — Pillsbury Winthrop Shaw Pittman LLP

(57) ABSTRACT

A head-up display system for representing image information for an observer includes an image encoder for emitting a first image, a projection area including a portion of a composite pane for deflecting a projection of an image, wherein a calibration system is arranged to ascertain a deviation between a first image and the projection of the first image and has a capturing system arranged to capture reflection properties of the composite pane and the image encoder is arranged to generate a correction image as a function of the deviation.

13 Claims, 4 Drawing Sheets

Figure 1:
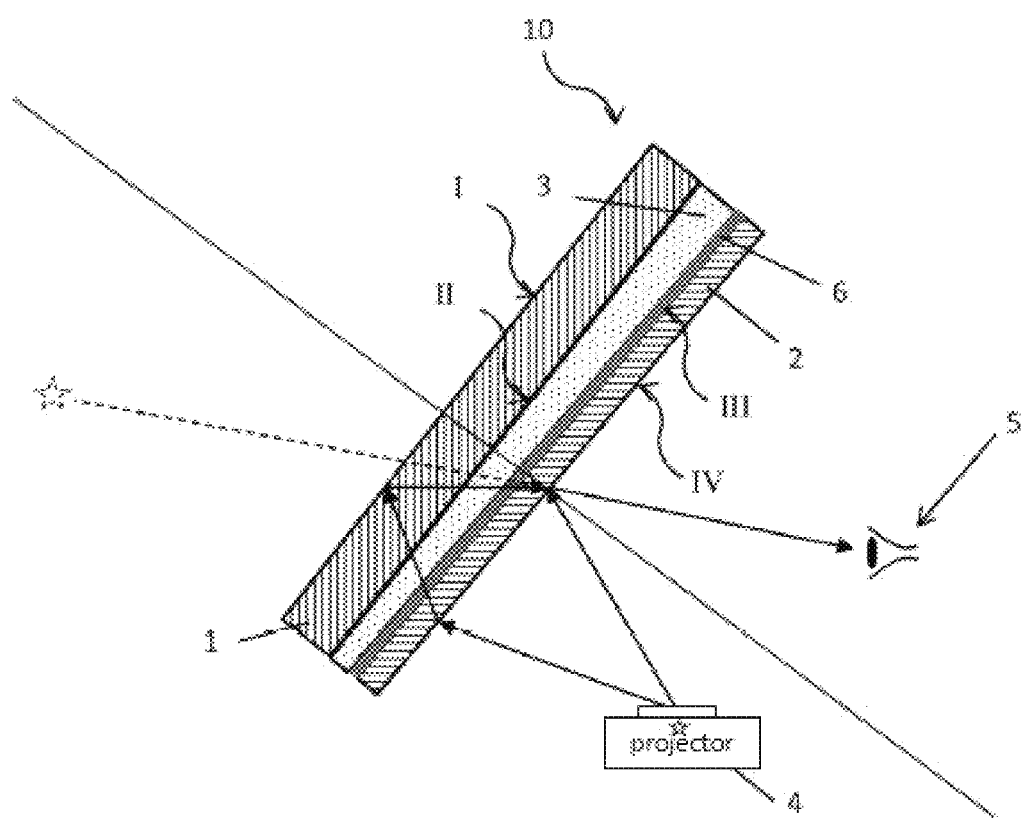

(51) Int. Cl.
*B60K 35/00* (2006.01)
*G02B 5/20* (2006.01)
*G06F 1/16* (2006.01)
*G01M 11/00* (2006.01)

(52) U.S. Cl.
CPC ........ *B32B 17/10761* (2013.01); *B60K 35/00* (2013.01); *G02B 27/01* (2013.01); *B60K 2370/1529* (2019.05); *G01M 11/00* (2013.01); *G02B 5/208* (2013.01); *G02B 2027/011* (2013.01); *G02B 2027/012* (2013.01); *G02B 2027/014* (2013.01); *G02B 2027/0138* (2013.01); *G02B 2027/0194* (2013.01); *G02B 2027/0196* (2013.01); *G02B 2027/0198* (2013.01); *G06F 1/1639* (2013.01)

(58) Field of Classification Search
CPC .... G02B 2027/0198; G02B 2027/0196; G02B 2027/014; G02B 2027/0138; G02B 2027/012; G02B 2027/0194; G02B 5/208; B32B 17/10761; B32B 17/10036; B32B 17/10568; B60K 35/00; B60K 2370/1529; G01M 11/00
See application file for complete search history.

(56) References Cited

U.S. PATENT DOCUMENTS

| | | | |
|---|---|---|---|
| 9,233,645 B2* | 1/2016 | Schofield | G02B 27/0101 |
| 9,656,537 B2* | 5/2017 | Dunkmann | B60J 1/008 |
| 2002/0130953 A1 | 9/2002 | Riconda et al. | |
| 2008/0165084 A1* | 7/2008 | Giegold | G06T 5/006 |
| | | | 345/7 |
| 2010/0314900 A1* | 12/2010 | Labrot | B32B 17/10036 |
| | | | 296/90 |
| 2011/0267700 A1 | 11/2011 | Schliep et al. | |
| 2015/0062345 A1 | 3/2015 | Kusanagi | |
| 2015/0321950 A1 | 11/2015 | Fischer et al. | |
| 2016/0004081 A1* | 1/2016 | Kasahara | G02B 27/0101 |
| | | | 345/633 |
| 2016/0041386 A1* | 2/2016 | Rodriguez | G02B 27/0101 |
| | | | 345/7 |
| 2017/0100919 A1* | 4/2017 | Lu | B32B 17/00 |
| 2017/0169612 A1* | 6/2017 | Cashen | G06F 3/013 |
| 2017/0285339 A1* | 10/2017 | Spangler | B32B 17/10788 |
| 2018/0373027 A1* | 12/2018 | Higuchi | G02B 27/01 |
| 2019/0011712 A1* | 1/2019 | Nagano | G02B 27/0179 |
| 2019/0033588 A1* | 1/2019 | Sadakane | G01M 11/00 |
| 2019/0137759 A1* | 5/2019 | Hirata | B60K 35/00 |

FOREIGN PATENT DOCUMENTS

| | | |
|---|---|---|
| DE | 10 2007 021230 A1 | 11/2008 |
| DE | 10 2014 005977 A1 | 9/2014 |
| DE | 10 2013 219556 A1 | 4/2015 |
| DE | 10 2014 224302 A1 | 6/2015 |
| EP | 2 616 869 B1 | 7/2013 |
| JP | H11-030764 A | 2/1999 |
| JP | 2005-509129 A | 4/2005 |
| JP | 2009-145540 A | 7/2009 |
| JP | 2009-282083 A | 12/2009 |
| JP | 2012-507426 A | 3/2012 |
| JP | 2016-023027 A | 2/2016 |
| JP | 2016-505831 A | 2/2016 |
| JP | 2016-508108 A | 3/2016 |
| JP | 2016-508109 A | 3/2016 |
| WO | WO 2007/083215 A2 | 7/2007 |
| WO | WO 2012/034767 A1 | 3/2012 |
| WO | WO 2016/034413 A1 | 3/2016 |
| WO | WO 2016/091435 A1 | 6/2016 |

* cited by examiner

HEAD-UP DISPLAY SYSTEM FOR CALIBRATING AND CORRECTING IMAGE INFORMATION FOR AN OBSERVER

CROSS-REFERENCE TO RELATED APPLICATIONS

This application is the U.S. National Stage of PCT/EP2017/061428, filed May 12, 2017, which in turn claims priority to European patent application number 16179955.6 filed Jul. 18, 2016. The content of these applications are incorporated herein by reference in their entireties.

The invention relates to a head-up display system, a method for calibrating the head-up display system, and use thereof.

Vehicles, in particular passenger cars, are increasingly equipped with so-called head-up displays (HUDs). Head-up-displays are provided for representing image information for an observer or driver. With a projector as an image encoder, for example, in the region of the dashboard or in the roof region, images are projected onto the windshield, reflected there, and perceived by the driver as a virtual image (from his point of view) behind the windshield. Thus, important information can be projected into the driver's field of vision, for example, the current driving speed, navigation or warning messages, which the driver can perceive without having to divert his glance from the road. Head-up displays can thus contribute significantly to an increase in traffic safety.

Usually, windshields comprise two glass panes that are laminated to one another via a thermoplastic film. If the surfaces of the glass panes are to be arranged at an angle, it is common to use a thermoplastic film with a non-constant thickness. This is also referred to as a wedge-shaped film or a wedge film. The angle between the two surfaces of the film is referred to as a wedge angle. The wedge angle can be constant over the entire film (linear change in thickness) or change as a function of position (nonlinear change in thickness).

With the above described head-up display, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). This problem is commonly resolved in that the reflecting surfaces are arranged at an angle relative to one another deliberately selected such that the primary image and the secondary image (ghost image) coincide, as a result of which the secondary image (ghost image) is no longer distractingly noticeable.

It is also known to provide windshields with transparent, electrically conductive coatings. These coatings can act as IR-reflecting coatings to reduce the heating up of the vehicle interior and thus to improve thermal comfort. The coatings can, however, also be used as heatable coatings by connecting them to a voltage source such that a current flows through the coating. Suitable coatings include conductive, metallic layers based on silver.

Windshields with conductive coatings in the interior of the composite glass have, in connection with head-up displays, the problem that the conductive coating forms an additional reflecting boundary surface for the projector image. This results in another undesirable secondary image, which is also referred to as a layer reflection or a "layer ghost".

DE102014005977 discloses a HUD projection arrangement with a coated windshield. To avoid distracting images, it is proposed, in the case of a sharp virtual image, to filter near infrared light components out of the imaging light beams. However, this solution has the disadvantage that the projector has to have additional infrared absorption elements in the beam path.

The object of the invention is to provide a head-up display system that has a composite pane with an electrically conductive coating, wherein a distracting effect of the layer reflection generated by the coating should be minimized as much as possible.

The object of the present invention is accomplished according to the invention by a head-up display system in accordance with claim 1. Preferred embodiments are apparent from the dependent claims.

The head-up display (HUD) system for representing image information for an observer comprises an image encoder for emitting a first image, as well as a projection area comprising a portion of a composite pane for deflecting a projection of an image. The head-up display system according to the invention also includes calibration means that are provided for ascertaining a deviation between the first image and the projection of the image. The calibration means have capturing means that are provided for capturing reflection properties [sic] of the composite pane. The image encoder is provided for generating a correction image as a function of the deviation.

A correction image is an image that is emitted by the image encoder and in which an electronic distortion or deformation of the first image has occurred. The distortion or deformation of images is based on the previously measured deviation between the first image and the projection of this first image. The measured deviation is compensated by means of the distortion or deformation of the correction image. Such an electronic distortion is also referred to as predistortion or warping. In other words, the correction image is an image in which an electronic predistortion of the first image has occurred. Such compensation of the distracting reflection significantly improves the sharpness of the projected image.

The term "image encoder" can be understood to mean an imaging device such as a projector, LCD display, TFT display. In the context of the invention, the term "image information" can be understood to mean data that are presented to the observer in the form of images. An image can have digital image data.

Preferably, the calibration means have capturing means that serve for determining the reflection properties. The calibration means can have a software component for determining a distortion of the first image. The software component can be stored on an external hardware-based control unit, e.g., a computer. The control unit can have an input/output unit via which a user can activate the head-up display system with the calibration means. The software component is provided for controlling the capturing means and the image encoder as well as for storing image recordings and evaluating the image data. This has the advantage that the image emitted can thus be influenced such that the projected image is distinguished by a clear and qualitatively better impression.

These image data, in particular image data regarding the distortion can, for example, then be transmitted to the image encoder. For this, the image encoder can have an interface to which the image data are sent by the control unit. Such an interface can be easily implemented on the image encoder and the image data can be made available to the image encoder in a simple manner.

The capturing means can include a storage medium in which the image data of the individual images can be stored. The calibration means can also have a photographic device for taking pictures. The apparatus for taking pictures can be implemented as a single camera or as a camera system with a plurality of cameras. In particular, the software component serves for controlling the apparatus for taking and for storing images and for evaluating the images captured by the apparatus for recording. The evaluation of the images captured is preferably done by means of a matrix calculation.

Advantageously, the image encoder is provided for generating the correction image. In particular, the correction image can be implemented as an at least partial overlapping of the primary reflection, secondary reflection, and/or the layer reflection (ghost). This has the advantage that the image projected acquires a clear depth effect.

The composite pane can comprise an outer pane and an inner pane that are joined to one another via a thermoplastic intermediate layer. The surface of the inner pane facing the intermediate layer has a transparent, electrically conductive coating. The electrically conductive coating can have at least one metallic layer and a plurality of dielectric layers by means of which the reflection properties of the composite pane are substantially determined, in particular. a reflection color of the composite pane. The number, thickness, and composition of the layers can influence the reflection color of the composite pane. The reflectance of the coating is not constant over the color spectrum, but, instead, has a maximum in one or a plurality of wavelength ranges of the visible spectrum. This causes a color change from white light to a specific color that is referred to as a reflection color.

The calibration means can be implemented such that the generation of the correction image can be done as a function of the reflection color of the composite pane or the thickness of the inner pane. A color from the color spectrum can be selected by intensely emitting a wavelength of light. Based on the reflection color, the control unit selects a wavelength range of the light that is that is emitted intensified in the correction image and forwards the image data to the image encoder. The color of the first image is altered such that the reflection behavior of the coating is compensated. For example, true color (e.g.: white) characters can be reproduced in the correction image in that the the image encoder intensely emits a complementary (e.g.: blue) color to the reflection color (e.g.: red) of the composite pane. The color of the correction image is specifically adapted to the reflection color of the composite pane.

The composite pane can be implemented as a vehicle windshield. The composite pane is intended, in an opening, in particular a window opening of a vehicle, to separate the interior from the outside environment. In the context of the invention, the term "inner pane" refers to the pane facing the interior (vehicle interior). The term "outer pane" refers to the pane facing the outside environment.

The thickness of the intermediate layer is variable, at least in sections, in the vertical course between the lower edge and the upper edge of the composite pane. Here, "in sections" means that the vertical course between the lower edge and the upper edge has at least one section in which the thickness of the intermediate layer varies depending on position. However, the thickness can also vary in a plurality of sections or in the entire vertical course. The term "vertical course" refers to the course between the lower edge and the upper edge with the direction of the course being substantially perpendicular to said edges. An intermediate layer with variable thickness is typically referred to as a "wedge film". The angle between the two surfaces of the intermediate layer is referred to as a "wedge angle". If the wedge angle is not constant, the tangents to the surfaces must be used for its measurement at a point.

When the image encoder is aimed at the composite pane to generate a projection of an image, the desired first virtual image is generated by reflection on the interior-side surface of the inner pane facing away from the intermediate layer. The part of the beam not reflected passes through the composite pane and is reflected once again on the exterior-side surface of the outer pane facing away from the intermediate layer. Thus, a second virtual image (ghost image) is generated. In the case of parallel pane surfaces, the image and the ghost image would appear offset relative to one another, which is distracting for the observer. By means of the wedge angle, the second virtual image substantially coincides spatially with the first virtual image such that the observer perceives only a single image.

The composite pane has, according to the invention, a transparent, electrically conductive coating on the surface of the inner pane facing the intermediate layer. The coating produces another boundary surface with a significant change in the refractive index. Thus, another reflecting boundary surface for the light beam of the image encoder is created. The coating thus produces another undesirable ghost image, the so-called "layer reflection".

The term "transparent coating" means a coating that has average transmittance in the visible spectral range of at least 80%, which thus does not substantially restrict vision through the pane.

The inner pane and the outer pane have asymmetric thicknesses. An asymmetric thickness combination is an arrangement of an inner and outer pane in which the two panes can have different thicknesses. Further asymmetric thickness combinations (inner pane/outer pane) can have the following values: 1.6 mm/2.1 mm, 1.4 mm/1.8 mm, 1.4 mm/2.1 mm, 2.1 mm/2.6 mm, 1.0 mm 1.4 mm.

The inner pane preferably has a thickness less than 1.6 mm such that the total thickness of the composite pane can be at least 4.0 mm to 6.0 mm, preferably 4.4 mm. Due to the wedge angle according to the invention, the thickness of the composite pane is not constant. In the context of the invention, the total thickness is measured at the thinnest side edge, i.e., typically at the lower edge of the composite pane. The total thickness is thus the minimum total thickness occurring.

The composite pane is preferably curved in one or a plurality of spatial directions, as is customary for motor vehicle windowpanes, wherein typical radii of curvature are in the range from approx. 10 cm to approx. 40 m. The composite pane can, however, also be flat, for example, when it is intended as a pane for buses, trains, or tractors.

The region of the composite pane that is intended to be illuminated by the projector in order to create the virtual image is also referred to as the "HUD region" of the composite pane. In the HUD region of the composite pane, the geometry of the composite pane can advantageously have a vertical radius of curvature between 5 and 15 meters as well as a horizontal radius of curvature between 1 and 5 meters.

The head-up display system can preferably include an optical module for deflecting the correction image generated by the image encoder in the direction of the composite pane.

The optical module can be implemented as a combiner, mirror, prism, and/or lens device.

The invention also includes a method for calibrating a head-up display system, wherein a first image is emitted by an image encoder, the first image is deflected by at least a portion of a composite pane as a projection area, and is captured by calibration means. A deviation between the first image and the projection of the image is measured by the calibration means. The image encoder generates a correction image as a function of the deviation. The correction image is an image wherein an electronic predistortion, deformation, and/or coloring of the first image has occurred.

The invention also includes the use of a head-up display system according to the invention in a motor vehicle, preferably a passenger car.

In the following, the invention is explained in detail with reference to drawings and exemplary embodiments. The drawings are schematic representations and are not true to scale. The drawings in no way restrict the invention.

Figure 2:
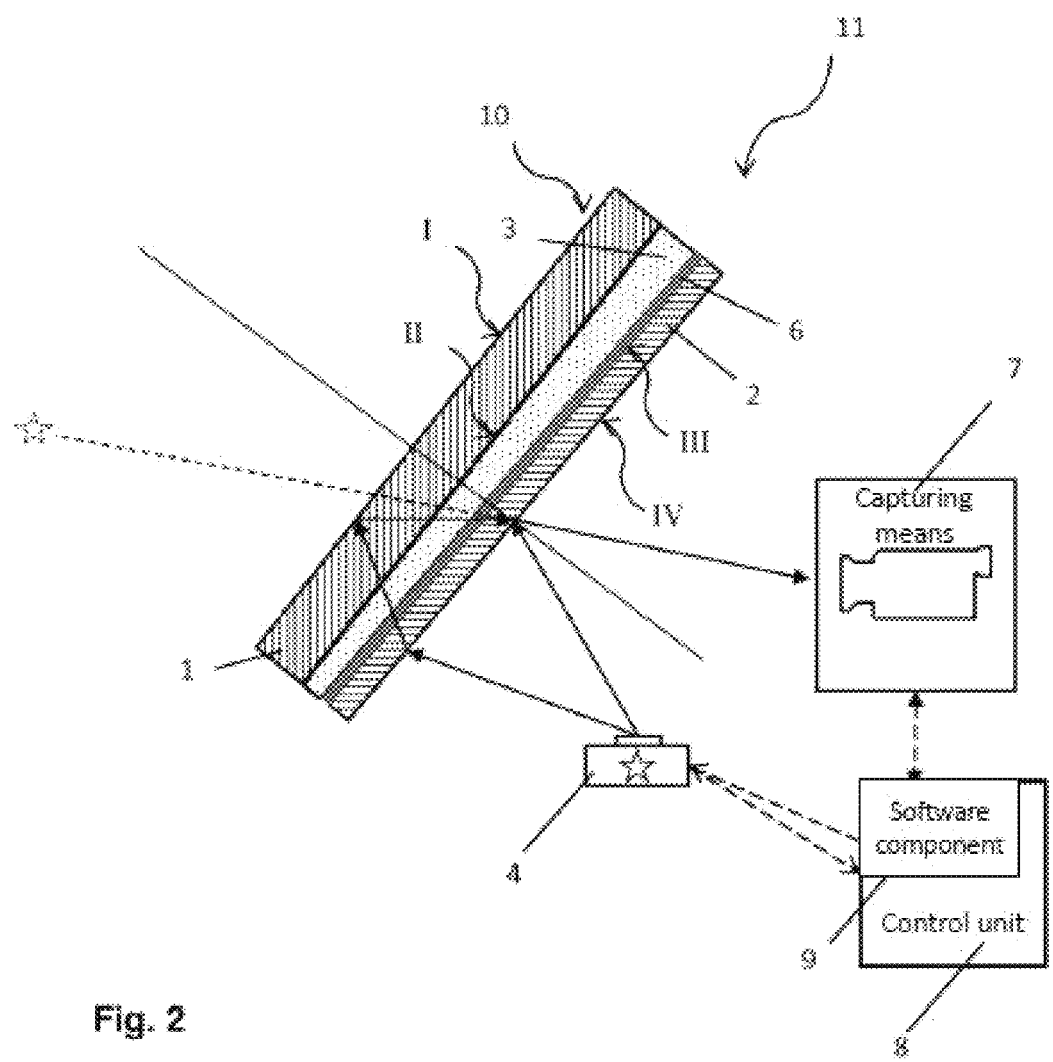
Figure 3:
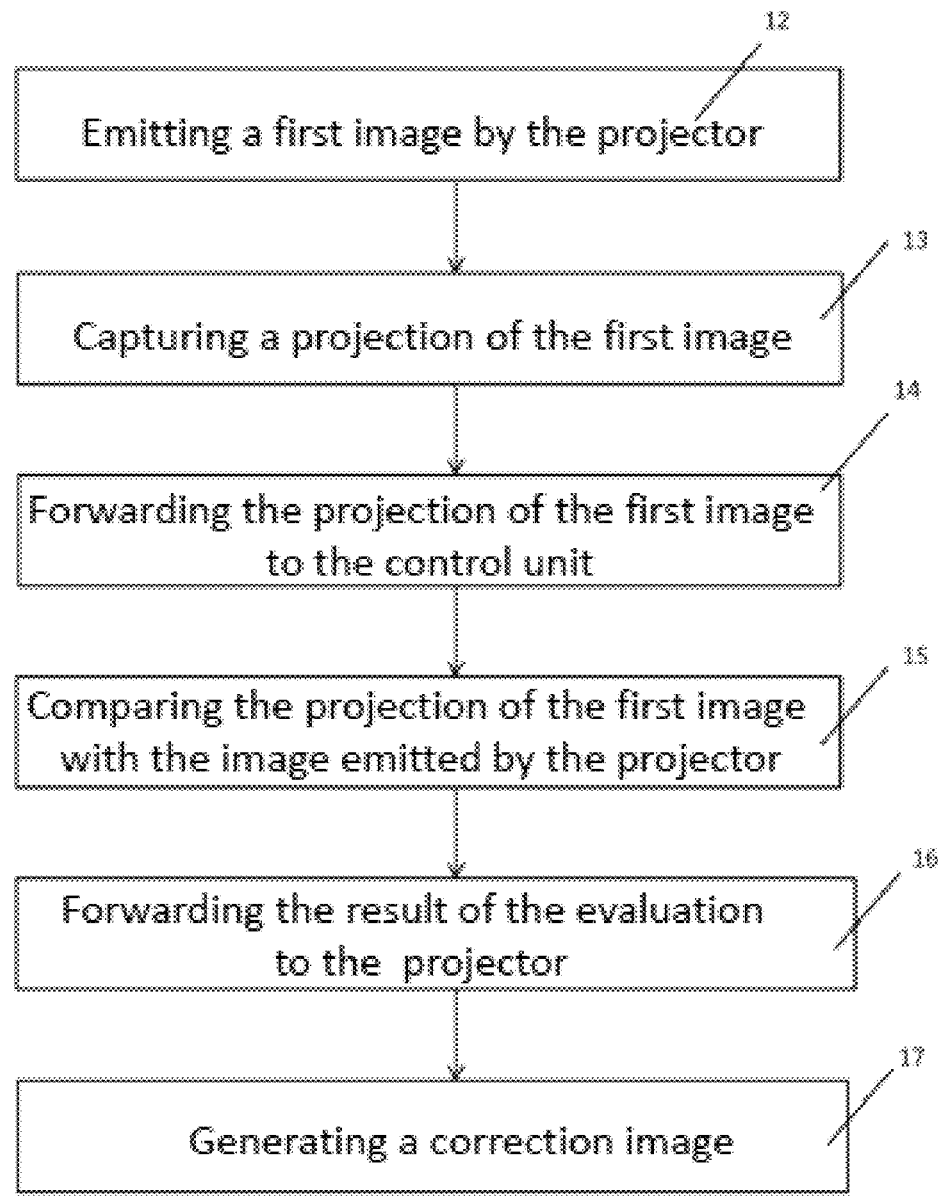
Figure 4:
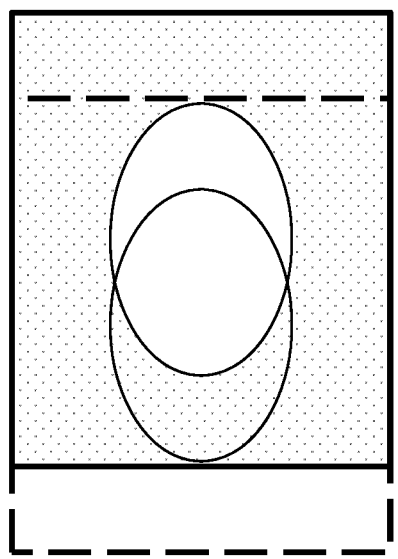

They depict:

FIG. 1 a composite pane as a component of a head-up display system according to the invention, FIG. 2 a head-up display system according to the invention, FIG. 3 a flowchart of an embodiment of the method according to the invention, and FIG. 4 a schematic representation of a correction image FIG. 1 depicts a composite pane 10 as a component of a head-up display system according to the invention that comprises an outer pane 1 and an inner pane 2 that are joined to one another via a thermoplastic intermediate layer 3. The composite pane 10 is intended as a windshield of a motor vehicle that is equipped with a head-up display. In the installed position, the outer pane 1 faces the outside environment; the inner pane 2, the vehicle interior.

FIG. 1 further depicts a projector 4 as an image encoder of the HUD system, which is aimed at a portion of the composite pane 10. In the portion (HUD region), the projector 4 can produce images that are perceived by the observer 5 (vehicle driver) as virtual images on the side of the composite pane 10 facing away from him. The wedge angle in the portion results in mutually inclined surfaces I, IV of the outer pane 1 and of the inner pane 2. The thin inner pane 2 results in superimposing of the layer reflection caused by the electrically conductive coating 6 with the primary reflection caused by the interior side surface of the windshield as well as the secondary reflection caused by the exterior side surface of the windshield, which, consequently, are no longer separately perceivable.

The outer pane 1 has an exterior-side surface I, which, in the installed position, faces the external environment, and an interior-side surface II, which, in the installed position, faces the interior. The inner pane 2 also has an exterior-side surface III, which, in the installed position, faces the external environment, and an interior-side surface IV, which, in the installed position, faces the interior. The interior-side surface II of the outer pane 1 is joined to the exterior-side surface III of the inner pane 2 via the intermediate layer 3.

The thickness of the intermediate layer 3 increases steadily in the vertical course from the lower edge to the upper edge of the composite pane. For the sake of simplicity, the increase in thickness is shown as linear in the figure but can also have more complex profiles. The intermediate layer 3 is formed from a single film of PVB (a so-called "wedge film" with variable thickness). The wedge angle a is between 0.25 mrad and 0.8 mrad, preferably between 0.35 mrad and 0.65 mrad. In HUD systems with a large image width, such as an augmented reality (AR) HUD system, wedge angles of 0.1 mrad to 0.3 mrad are also used.

HUD systems that operate with a computer-supported expansion of the user's perception of reality are referred to as AR HUD systems.

For a wedge angle of 0.5 mrad and a composite pane with a height of 1 meter, i.e., an average height of a passenger car windshield, this amounts to an approx. 0.5 mm thickness change (e.g., 0.76 mm at the lower edge and 1.26 mm at the upper edge of the composite pane). Thickening of the film is a function of both the wedge angle and the pane height. In the case of a preferred inner pane/outer pane glass combination of 1.6 mm/2.1 mm, the total glass thickness would be 4.46 mm at the lower edge and 4.96 mm at the upper edge of the composite pane.

Due to the wedge-shaped implementation of the intermediate layer 3, the two virtual images that are produced by reflection of the projector image on the surfaces I and IV coincide. Consequently, the secondary reflection does not appear offset relative to the primary reflection such that distracting reflection images can be avoided. Instead, the layer reflection creates another virtual image that results in one virtual image by superimposing with the primary reflection and the secondary reflection.

The composite pane 10 also has an electrically conductive coating 6 on the exterior-side surface III of the inner pane 2. The coating 6 is IR-reflecting and is provided to reduce the heating up of the vehicle interior by the IR component of sunlight. The coating 6 is, for example, a thin-film stack including two or three layers of silver and other dielectric layers that optimize the optical, electrical, and/or mechanical properties of the coating, as antireflection layers, blocker layers, or surface matching layers. The dielectric layers of the conductive coating 6 contain, for example, silicon nitride, silicon oxide, zinc oxide, tin zinc oxide, and aluminum nitride.

The coating 6 constitutes another reflecting boundary surface in the interior of the composite pane 10, on which the correction image according to the invention is reflected one more time.

The inner pane 2 is made of soda lime glass and has, for example, a low thickness of only 1.6 mm. This ensures that the spatial offset between the primary reflection and the layer reflection is small and the virtual images coincide such that a sharp, true-color correction image develops in the eye of the observer 5.

The outer pane 1 is likewise made of soda lime glass and has a significantly greater thickness of, for example, 2.1 mm. This ensures that the composite pane 10 as a whole has sufficient mechanical stability, fracture strength, and torsional rigidity.

The minimum thickness of the intermediate layer 3 is, for example, 0.76 mm (measured at the lower edge U). The intermediate layer 3 is implemented here by a single, wedge-shaped PVB film. However, a multilayer structure of the intermediate layer 3 is also conceivable, for example, a 0.36-mm-thick PVB film with constant thickness, a 0.76-mm-thick PVB wedge film, and, therebetween, a 0.05-mm-thick PET film.

The total thickness of the composite pane 10 is, consequently, approx. 4.5 mm. The total thickness is measured at the thinnest side edge, namely the lower edge.

FIG. 2 depicts a head-up display system according to the invention with calibration means. The calibration means include capturing means 7 for capturing a projection of the first image and a control unit 8 with a software component 9 for controlling the capturing means 7 and for evaluating the projection. The capturing means 7 are implemented as a camera system with a plurality of cameras for recording the projection. Image data of the recording are then forwarded to the control unit 8. The control unit 8 is a computer with a plurality of compatible interfaces that are suitable for receiving image data of the capturing means 7 and for exchanging image data with the image encoder. Such interfaces are wired and/or wireless and are capable of operating according to one of the following standards: WLAN (Wi-Fi, IEEE 802.11), NFC, or Bluetooth. The control unit 8 further has a user interface on which a user of the head-up display system can interact with the calibration means.

The projector 4 emits a first image, which is deflected via the composite pane 10 as a virtual image. The camera system of the capturing means 7 acquires the virtual image and stores image data of the virtual image. The image data are then forwarded via an interface to the control unit 8. The control unit 8 receives the image data of the virtual image and compares them with image data of the first image emitted by the projector 4. The evaluation of the image data is done by the software component 9 using matrix calculation and is stored in the control unit 8. The evaluation of the image data is forwarded to the projector 4.

FIG. 3 depicts a flowchart of an exemplary embodiment of the method according to the invention for calibrating a head-up display system according to the invention.

In step 12 of the method, a first image is emitted by the projector 4. The first image is deflected by at least one portion of a composite pane as a projection area and captured as a projection of the first image in step 13 by a calibration means. The calibration means consist of a camera system 7 that receives the projection of the first image and in step 14, forwards it to the control unit 8. The control unit 8 can be implemented as an external computer with a storage medium. The control unit 8 has a software component 9 that compares, in step 15, the projection of the first image with the image emitted by the projector 4 and evaluates it. The evaluation of the images in the form of image data is done by the software component 9 using matrix calculation. In step 16, the result of the evaluation yields a deviation that is forwarded by the control unit 8 to the projector 4.

The deviation between the first image and the projection of the first image measured with the calibration means can result in warping, deformation, discoloration, or deformation of the first image. Using the deviation, in step 17, the projector 4 generates a correction image out of the first image. The correction image is an image, in which an electronic distortion, deformation, and/or coloration of the first image has occurred. Such a pre-adjustment of the projector 4 results in the fact that the correction image is displayed sharply and in true color. The information of the virtual image is clearly and unambiguously discernible for the observer.

FIG. 4 depicts a result of an evaluation. The evaluation can show that a design of the first image is changed. The correction image is then formed such that the primary reflection, the secondary reflection, and the layer reflection partially overlap and, in the best case, touch. By such superimposing of the reflection, a circular cutout can, for example, be represented in a continuous surface, in that an oval basic shape is emitted by the projector 4 as a correction image. By superimposing the oval basic shape with the secondary reflection and the layer reflection, the oval basic form creates in the observer the visual impression of a circular cutout. Images can be faded into the view of the observer giving the impression that they are part of the observer's surroundings. The application of the head-up display system according to the invention is particularly advantageous in navigation of the observer or driver of a vehicle. A navigation direction can be represented as a directional arrow by projecting an image of the directional arrow to the driver in his line of vision and creating the impression in the driver that the directional arrow was lying on his road.

In the case that the projector 4 has considered no deviation previously captured by the calibration means when generating an image, the image is reflected on the composite pane.

In the reflection of the image on the composite pane, three virtual images that do not overlap properly are produced by the primary reflection, the secondary, and the layer reflection. In that case, an unclear image that is not in true color and that contains unrecognizable information would be produced for the eye 5 of the driver.

LIST OF REFERENCE CHARACTERS (1) outer pane
(2) inner pane
(3) thermoplastic intermediate layer
(4) projector as image encoder
(5) observer/vehicle driver
(6) electrically conductive coating
(7) capturing means
(8) control unit
(9) software component
(10) composite pane
(11) head-up display system
(12) to (17) step
(I) exterior-side surface der outer pane 1, facing away from the intermediate layer 3
(II) interior-side surface der outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:

1. A head-up display system for representing image information for an observer, comprising:
    an image encoder for emitting a first image,
    a projection area comprising a portion of a composite pane for deflecting a projection of an image, and
    a calibration system arranged to ascertain a deviation between the first image and the projection of the image, the calibration system including a capturing system arranged to capture reflection properties of the composite pane,
    wherein the image encoder is arranged to generate a correction image as a function of the deviation,
    wherein the calibration system is provided for determining a reflection color of the composite pane, and
    wherein the calibration system is arranged to determine a distortion of the first image as a function of a thickness of an inner pane of the composite pane.

2. The head-up display system according to claim 1, wherein the composite pane comprises an outer pane and the inner pane joined to one another via a thermoplastic intermediate layer and a transparent, electrically conductive coating on a surface of the inner pane facing the intermediate layer.

3. The head-up display system according to claim 1, wherein the calibration system includes a control unit, the control unit arranged to select a wavelength range of light, and the image encoder arranged to emit the correction image in the selected wavelength range.

4. The head-up display system according to claim 1, wherein the composite pane is a vehicle windshield.

5. The head-up display system according to claim 1, further comprising an optical module arranged to deflect the correction image generated by the image encoder in the direction of the composite pane.

6. The head-up display system according to claim 1, wherein the projection area of the composite pane has a vertical radius of curvature between 5 and 15 meters and/or a horizontal radius of curvature between 1 and 5 meters.

7. The head-up display system according to claim 1, wherein the composite pane includes the inner pane and an outer pane, and the inner pane and the outer pane have asymmetric thicknesses.

8. A method for calibrating a head-up display system according to claim 1, comprising:

emitting a first image by an image encoder, deflecting the first image by a portion of a composite pane as a projection area and capturing the deflected first image as a projection of the image by a calibration system, measuring a deviation between the first image and the projection of the first image by the calibration system, and generating a correction image by the image encoder as a function of the deviation.

9. A method comprising utilizing a head-up display system according to claim 1 in a motor vehicle.

10. The method according to claim 1, wherein the motor vehicle is a passenger car.

11. The head-up display system according to claim 1, wherein the calibration system includes a storage medium including a software component for determining a distortion of the first image.

12. The head-up display system according to claim 11, wherein the image encoder has an interface for transmitting image data of the software component.

13. The head-up display system according to claim 11, wherein the image encoder is arranged to generate the correction image by means of the first image and the distortion.

* * * * *